Oct. 27, 1970
C. S. ARMSTRONG ET AL
3,535,911
FRICTION TEST METHOD AND APPARATUS
Filed Dec. 20, 1968
2 Sheets-Sheet 1
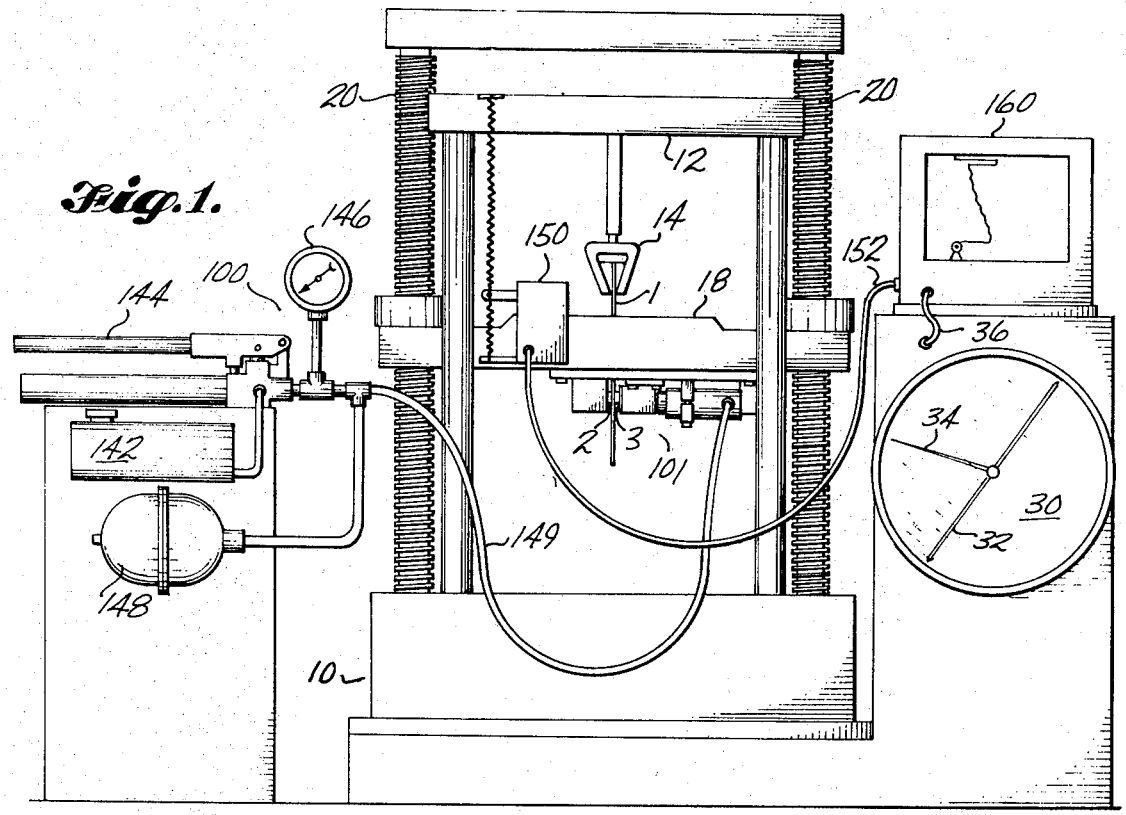
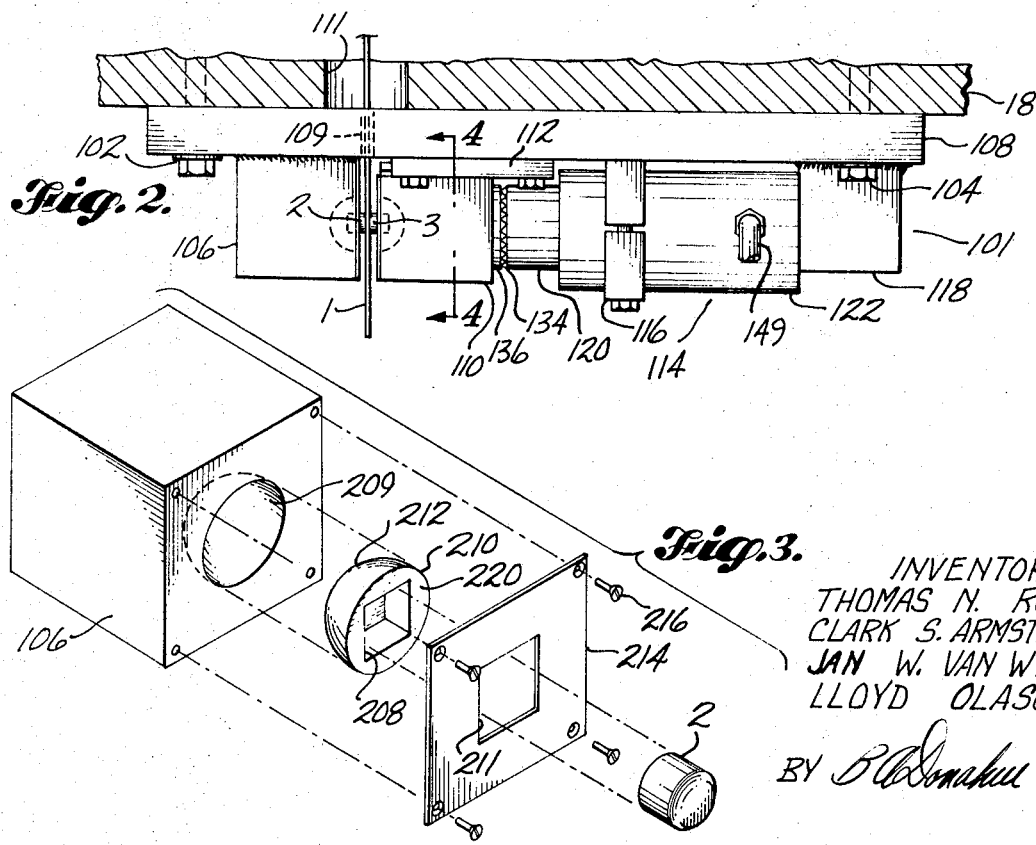
INVENTORS:
THOMAS N. ROSS
CLARK S. ARMSTRONG
JAN W. VAN WYK
LLOYD OLASON
BY B. O'Donahue
ATTORNEY Oct. 27, 1970  C. S. ARMSTRONG ET AL  3,535,911
FRICTION TEST METHOD AND APPARATUS
Filed Dec. 20, 1968  2 Sheets-Sheet 2

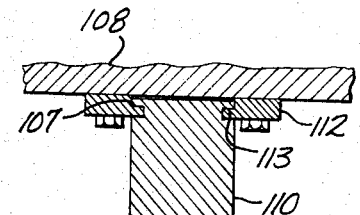

Fig. 4.

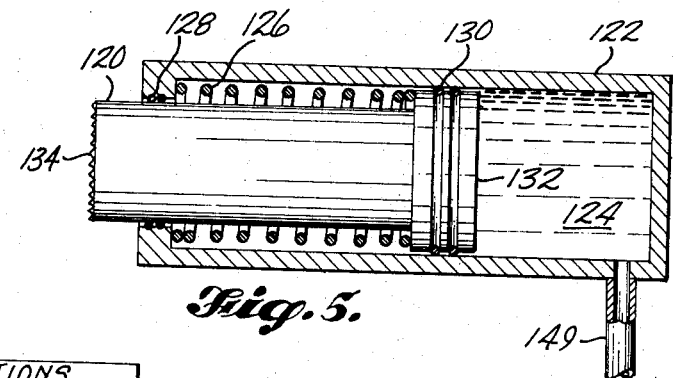

Fig. 5.

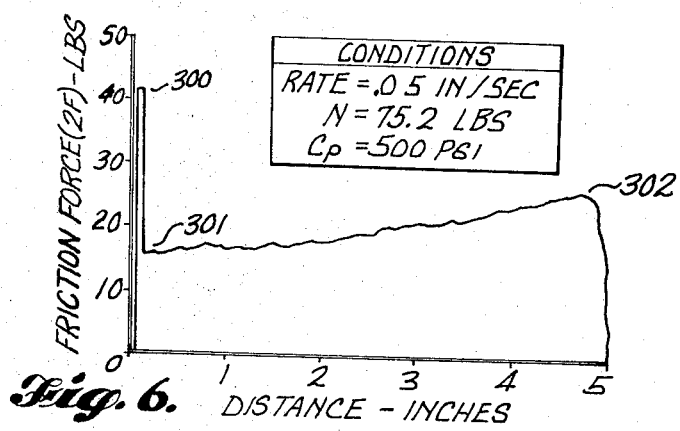

Fig. 6.

Fig. 7.  FRICTION TEST DATA – STRETCH DIE MATERIALS

| SPECIMEN NO.'S / MAT'L | BUTTON | STRIP |
|---|---|---|
| SPECIMEN DWG. NO. / SIZE | EPOCAST TYPE 1 | 2024 ALUMINUM |
| CONTACT FACE RADIUS OR CHAMFER | 1/2" DIA | 1"X 8"X 1/32" |
| H.T., PSI OR PROCESS | .05 r | |
| SURFACE ROUGHNESS | -- | T3 |
| PLATING, COATING, ETC. | FILED FLAT | AS ROLLED |
| | NONE | NONE |
| GREASE, OIL, ETC. | NONE | |
| NORMAL LOAD, LB. | 30; 52.5; 75.2; 120; 165; 210 | |
| NORMAL LOAD, PSI | 200, 350, 500, 800, 1100, 1400 | |
| SPEED, IPS | 0.05 | |
| BEARING AREA IN² | 0.1503 | |
| SPECIFIC EFFECTS– GALLING, BREAK, ETC. | LIGHT SCRATCHES AT ALL LOADS | |

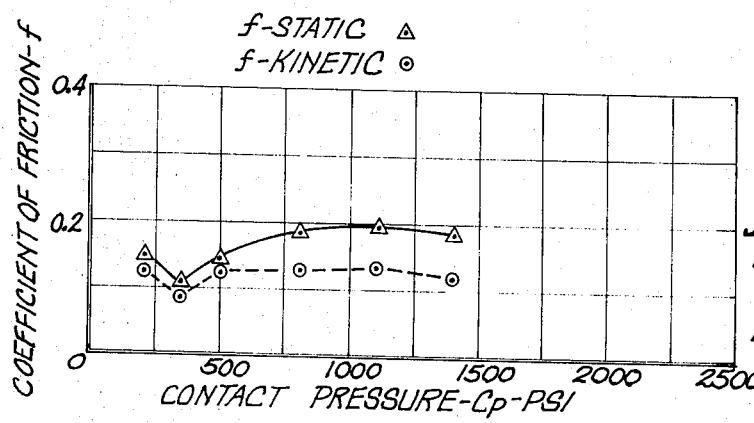

INVENTORS:
THOMAS N. ROSS
CLARK S. ARMSTRONG
JAN W. VAN WYK
LLOYD OLASON

BY

ATTORNEY

United States Patent Office 3,535,911
Patented Oct. 27, 1970

3,535,911
FRICTION TEST METHOD AND APPARATUS
Clark S. Armstrong, Lloyd Olason, and Thomas N. Ross, Seattle, and Jan W. Van Wyk, Kirkland, Wash., assignors to The Boeing Company, Seattle, Wash., a corporation of Delaware
Filed Dec. 20, 1968, Ser. No. 785,542
Int. Cl. G01n *19/02*
U.S. Cl. 73—9                                    6 Claims

ABSTRACT OF THE DISCLOSURE

A test method and apparatus for evaluating frictional forces between surfaces of various materials. A special adapter system is used in combination with certain conventional measuring and testing components to obtain friction values under preselected normal pressures, and at controlled rates of motion between surfaces. The adapter system is hydraulically actuated to apply a predetermined normal force to two button specimens which are positioned on opposite sides of a strip specimen. The button faces are held in self-aligning contact with the strip by rotatable bearing means while the strip specimen is effectively drawn between the buttons. A hydraulic accumulator is used to preclude variation in contact pressure, and a keyway is used to prevent the feedback of transverse forces into the normal force actuator.

BACKGROUND OF THE INVENTION

Field of the invention

The present invention relates to the testing of frictional surface characteristics of materials, and more particularly to an improved method and apparatus for obtaining the static and kinetic coefficients of friction between any two material surfaces.

Description of the prior art

In the manufacturing and aerospace industries there has long been a need for a system to accurately determine the static and kinetic coefficients of friction between any two materials under a variety of contact pressure levels and rates of motion. Such a system should be insensitive to operator technique so that results could be duplicated with similar materials under similar conditions.

As is well known, the static coefficient of friction acting between two materials is computed by means of the formula $f = F/N$, where N is the so-called normal force acting to create contact pressure between materials, and F is the force required to initiate sliding motion between the surfaces. The kinetic coefficient of friction is obtained by the same formula, wherein F becomes the force required to sustain motion. In the design of many mechanical systems it becomes necessary to take into account frictional forces which may be developed. Handbook values are notoriously unreliable, particularly in view of the fact that the coefficient will vary with each type of surface treatment used, with moisture and lubrication conditions, and often with the unit pressure loading created by the force N. Accordingly, it has been customary to obtain frictional parameters for design by conducting unique testing for each frictional application, or by making an empirical estimate, which may be verified only during testing of the final end product.

SUMMARY

It is the general purpose of this invention to provide a method and apparatus with which the static and kinetic coefficients of friction may be obtained quickly and accurately, under a preselected normal pressure loading and at a controlled rate of relative movement of the frictional surfaces.

In the apparatus to be described, a special adapter system is utilized in combination with certain testing components which are available from major manufacturers in this field and, in fact, are standard equipment in many large testing laboratories.

The friction test specimen contemplated by this invention will normally consist of three pieces, viz., two buttons and a flat strip; the strip being arranged to be drawn between the buttons. The adapter system applies a known normal load to the buttons while the strip specimen is effectively drawn between the buttons by the moving head mechanism of a tensile testing machine. The novel adapter system has been designed to provide means for applying a predetermined normal force and hence a preselected contact pressure, means for holding the buttons in self-aligning contact with the strip specimen, means for preventing variation in contact pressure with deformation of the specimen, and means for preventing the feedback of transverse friction forces into the normal force applying means.

It is contemplated that the adapter will be used with a quality tensile testing machine of the type which has a moveable crosshead portion, a fixed crosshead portion and in which a desired rate of displacement of the crosshead may be preselected for each test. Means are provided for mounting a portion of the adapter on one of the crossheads of such a machine, the other crosshead being utilized to hold the strip specimen. Such tensile testing machines are normally provided with electronic means for monitoring the force induced, and with a dial indicator which is responsive to the monitoring means to provide a visual indication of the force being applied. Additionally, many such machines have provision for operably connecting the applied force signal to a conventional X–Y plotter, so that a permanent record of each test may be made. In the system to be disclosed, a linear displacement gage of any conventional design is used to monitor the crosshead displacement. The displacement gage output signal, together with the applied force signal, is channeled to an X–Y plotter which provides a force versus displacement record of each test.

Accordingly, it is an object of this invention to provide a method and apparatus which will consistently and repeatably establish values for the static and kinetic coefficients of friction inherent between particular materials.

A further object of this invention is to provide friction test equipment in which a novel adapter system is used to maintain a preselected normal force and to provide for self-aligning contact of the frictional surfaces while certain readily available testing and measuring components are used in combination to provide controlled motion and a record of the data measured.

BRIEF DESCRIPTION OF THE DRAWINGS

FIG. 1 shows a side elevation view of the overall combination of testing components contemplated for the preferred embodiment.

FIG. 2 is an enlarged side elevation view of the specimen holding portion of the adapter system of FIG. 1.

FIG. 3 is an exploded view of one of the specimen holding means of FIG. 2.

FIG. 4 is a sectional view taken at 4—4 in FIG. 2.

FIG. 5 is an enlarged sectional view of the hydraulic force applying means of the adapter of FIG. 2.

FIG. 6 is a plot of applied force versus displacement data obtained during a typical test run.

FIG. 7 is a typical plot of data obtained from a series of test runs in which various contact pressures were applied to the frictional surfaces.

DESCRIPTION OF THE PREFERRED EMBODIMENTS

FIG. 1 shows a side elevation view of the overall combination of testing components which may be used to obtain frictional data on the contact surfaces between a strip specimen 1 and button specimens 2 and 3. A universal test machine, for example, a Tinius-Olsen 60,000 lb. Electomatic Tester, is shown at 10. As is well-known in the materials testing field, such machines are typically equipped with a fixed crosshead 12, to which gripping jaws 14 are attached for the purpose of retaining the upper end of a test specimen. In normal use, gripping jaws similar to jaws 14, are attached to moveable crosshead 18 for the purpose of gripping the lower end of the specimen. A controlled rate of motion is established by selection of a particular rate of rotation of the loading screws 20. In such systems the force required to sustain movement of the crosshead 18 is measured by force monitoring means included within the universal tester 10. This particular means is not shown in FIG. 1 but typically comprises means such as a differential transformer which is sleeved to a load responsive torsion bar. The electrical signal developed by such means is transmitted to the large dial indicator 30 which provides for visual monitoring of the induced load by means of pointer 32 and maximum load indicator 34.

In the friction test method and apparatus of this disclosure, the gripping jaws which are normally mounted on the moveable crosshead 18 of the universal tester 10 are removed and a specimen holding means 101 of the adapter system 100 is fixedly attached to the moveable crosshead 18. The adapter system includes a hydraulic fluid source 142, pump means 144, pressure monitoring and indicating means 146, conventional pressure accumulator means 148, and fluid conduit 149. In a manner to be described, the adapter system causes the button specimens 2 and 3 to contact the strip specimen 1 under a preselected normal force contact pressure. Conventional linear displacement monitoring means 150 is attached to the moveable crosshead 18 and is operably connected to fixed crosshead portion 12 so that it will generate a signal which is proportional to the relative travel of the crossheads. In the preferred embodiment shown in FIG. 1, a conventional X–Y plotter 160 provides a permanent record of total induced friction force versus displacement. The plotter 160 is operably connected to displacement monitoring means 150 and the force monitoring means of the universal tester 10 by electrical conduit means 152 and 36 respectively.

FIG. 2 provides an enlarged showing of the specimen holding means 101 of the adapter system 100. The means 101 is fixedly attached to the moveable crosshead 18 by bolts 102 and 104. A specimen support block 106 is rigidly carried by base plate 108, as for example, by welding. The block 106 retains button specimen 2 in contact with strip speciment 1. Specimen support block 110, which carries bearing plate 136, is arranged for lateral movement toward and away from strip speciment 1 on keyway block 112 which is rigidly mounted on base plate 108. The keyway arrangement is detailed in FIG. 4, which is a cross section taken at 4—4 in FIG. 2. Note that the upper flanges 107 of the block 110 are retained in a close sliding fit between base plate 108 and the keyway surface 113. Accordingly, vertical loads acting on block 110 during testing will be reacted into the base plate 108, thereby effectively precluding the feedback of transverse binding loads into the linear actuator system 114.

The linear actuator system 114 is held in position by clamp 116 and loading block 118, which are rigidly secured to base plate 108. The actuator system 114 includes a force delivering piston 120, a cylinder portion 122 and fluid supply line 149. This generally conventional hydraulic actuator is detailed in the sectional view of FIG. 5, where it can be seen that the supply line 149 is ported into pressure chamber 124 and that fluid seals are provided at 128 and 130. The pressure in chamber 124 acts upon piston backface 132 to overcome the force developed by return compression springs 126, thereby moving the piston to the left (as shown) into position to deliver an actuating force.

From FIG. 2, it is apparent that when the actuator system 114 is pressurized, the piston 120 will exert a force through knurled face plate 134 onto bearing plate 136 of the moveable support block 110, thereby urging moveable block 110 along keyway block 112 to a position bringing the button specimen 3 into bearing contact with strip specimen 1, which is reacted by button specimen 2 and fixed support block 106. Therefore, upon pressurization of actuator system 114 the button specimens 2 and 3 are caused to contact the strip specimen 1. For purposes of friction testing, the contact force is a normal force which causes a contact pressure to be developed between specimen surfaces. This is the type of normal force, N, required in the calculation of the coefficient of friction, $f=F/N$.

In the testing of materials under a variety of normal loadings, it has become evident that friction characteristics of many materials change significantly with variations in contact pressure. Therefore, if the contact faces of the button specimens 2 and 3 are subject to uneven pressure distribution due to misalignment with the face of the strip specimen 1, the accuracy and repeatability of test results may be adversely affected. Additionally, extreme misalignment of specimen bearing faces can cause galling and gouging conditions. In recognition of these factors, provisions have been made in the specimen holding means 101 for means to ensure a continuing full face contact of button specimens 2 and 3 with the face of strip specimen 1. Rotatable bearings which are essentially self-aligning are provided for each of 2 and 3. As is best shown in the exploded view of FIG. 3, the generally cylindrical button specimen 2 is sized to allow a slip fit insertion into square recess 208 in hemispherical specimen holder 210, which is provided with spherical bearing surface 212. When assembled, the holder 210 is retained in the hemispherical recess 209 in block 106. The matched surfaces 209 and 212 are machined to bearing tolerances and smoothness so that when a light lubricant is added, the holder 210 will freely rotate within the block 106. A retainer plate 214 is attached to block 106 by screws 216 and performs the function of retaining the holder 210 in position within the recess 209 while allowing a suitable degree of relative rotation before the outer edges of holder surface 220 come into contact with retainer plate 214. The window 211 in the retainer plate 214 is sized slightly larger than recess 208 to allow free insertion and relative movement of button specimen 2.

It is to be noted that while the button specimen 2 is shown in FIG. 3 to have a cylindrical configuration, that other shapes can be used to obtain satisfactory results. For example, a generally square shape will fit into the recess 208 and should yield satisfactory results provided the sharp corners of the contact face are rounded or chamfered. Also, the geometry of recess 208 can be varied from the square shape shown. To date, most of the testing performed by applicants have been with cylindrical button specimens ½ inch in diameter and .160 inch thick, with the edges of the contact face provided with a .05 inch radius. Repeatability and consistency of test results is enhanced by the standardization of the button specimens. While the size or shape of the strip specimen 1 is of relatively minor importance, applicants' strip specimen has usually been from 8 to 12 inches long, from ¾ inch to 1 inch wide, and 1/10 inch to ⅛ inch thick.

In performing a series of tests with the apparatus of this disclosure, the specimen holding means 101 of the adapter system 100 is mounted on the moving crosshead 18 of the universal tester 10 by the bolts provided at 102 and 104. At this time the adapter system 100 is not pressurized. Therefore, the actuator piston 120 is in its retracted position, and the movable specimen holder block 110 is free to translate laterally on keyways 112. The moving crosshead 18 is then brought into close proximity with the stationary gripping jaws 14. The test strip 1 is inserted between the specimen block holders 106 and 110, through the clearance hole 109 in base plate 108, through the clearance hole 111 in movable crosshead 18, and into the jaws 14, which are suitably tightened to grip and hold the specimen 1. The button specimen 2 is then inserted behind strip specimen 1 and into the recess 208 of holder 210 which is contained in the fixed block 106. Normally the strip specimen 1 will serve to hold the button specimen 2 loosely in place while the next operations are carried out. Since the actuator 114 is not under pressure, the piston 120 will have been moved to its retracted position by the return spring 126. Therefore, the movable block 110 can be moved away from strip specimen 1 to allow insertion of button specimen 3 in the same manner that button specimen 2 was inserted. The movable block 110 is then returned to a position where button specimen 3 comes into contact with strip specimen 1.

With the button specimens loosely in place, the crosshead 18 may be moved to obtain the desired starting position for the test, allowing a sufficient length of strip specimen 1 below the buttons so that the buttons will not run off of the strip during testing. Pressure is then developed in the adapter system 100 by operation of pump 144, which pressurizes chamber 124 of the actuator 114, thereby moving piston 120 to the left against the resistance of return spring 126. Pressure in the system is raised slowly until the knurled face plate 134 of piston 120 is brought into contact with bearing plate 136 of the movable block 110. At this point, the reading on pressure gage 146 is noted, and recorded as value $P_1$; this value being the pressure required to initially position the system for testing.

Since frictional characteristics vary with the contact pressure induced at the frictional interface, applicants customarily run a series of tests, each with a different prescribed contact pressure. It will be readily recognized that the value of hydraulic pressure $P_t$ required to give a desired contact pressure may be computed by the following relationship:

$$P_t = P_1 + \frac{A_b \times C_p}{A_p}$$

where $P_t$ is the required pressure in p.s.i. at gage 146; $P_1$ is the above-mentioned initial positioning pressure in p.s.i.; $A_b$ is the contact surface area of a button specimen in square inches; $C_p$ is the desired contact pressure at the frictional interface in p.s.i.; and $A_p$ is the area of the piston backface 132 in square inches.

After the hydraulic pressure in adapter system 100 is raised to the value $P_t$ to give the desired contact pressure between specimens, testing may be initiated. It is to be noted that the hydraulic accumulator 148 will function to maintain a constant pressure in the system 100, in spite of specimen deformation and/or minor leakage in the pump 144 or its associated conduits. Testing is initiated in a manner similar to tensile testing, i.e., by selecting the desired rate of motion in inches per second on the universal tester (usually by rotation of a control knob) and by pushing the start button of the tester. When the test begins, the friction load will build up to a certain value before motion begins. This value, monitored by load indicator pointers 32 and 34 and by the data trace on the recorder 160, is the sum of the frictional forces developed on each side of strip specimen 1 and is therefore twice the value $f=F/N$. The value of N to be used for a particular test run is, of course, the product of the quantities $A_b$ and $C_p$, as previously defined.

Upon initiation of movement, the X-Y plotter 160 moves its ordinate or Y indexing mechanism in response to signals generated by displacement gage 150. A friction force signal arrives at the recorder through conduit 36 and controls the recorder abscissa indexing mechanism.

Motion of the button specimens over the strip is allowed to continue for the desired travel, taking care that the buttons do not run off of strip specimen 1. An example of a typical data trace obtained from X-Y plotter 160 during a test run is set forth in FIG. 6 of the drawings.

FIG. 6 is a plot of the total measured friction force (2F) versus distance traveled in inches. The peaked force value shown at initiation of test, at 300, is, of course, the value 2F to be used in computing static coefficient of friction. The continuing values of 2F after movement has begun yield the F value to be used in computing the kinetic coefficient of friction. The gradual increase in the value of kinetic friction from start of testing, at 301, to the conclusion of testing, at 302, is characteristic of many of the materials testing by the applicants. Usually, this increase is the result of wear deterioration of the friction surfaces.

FIG. 7 provides a typical summary data sheet and plot obtained from a series of friction tests conducted under a variety of normal load contact pressures at the friction interface. The values of static and kinetic coefficient of friction have been obtained and plotted for six different values of contact pressure within a range pertinent to a particular engineering design problem.

It is to be noted that certain variations from the method and apparatus disclosed will be apparent to those skilled in this art. For example, the disclosed system may be used to test hardware items such as cable clamps, merely by providing a mechanical adapter to nest into the specimen holders in the manner of the button specimens 2 and 3. Also, single button testing could be accomplished if desired by the expedient of replacing the second button with a very low friction element, such as a roller or gas bearing. Further, a more expensive embodiment might include a sophisticated pressure transducer and recording means. A low cost system could utilize mechanical normal force applying means such as a jack screw.

What is claimed is:
1. A friction test method comprising:
   (1) holding a first specimen,
   (2) arranging and placing second and third specimens on opposite sides of said first specimen,
   (3) applying a predetermined normal force across said specimens,
   (4) causing relative movement of said second and third specimens with respect to said first specimen while maintaining the contact surfaces of said second and third specimens in alignment with the contact surface of said first specimen,
   (5) measuring the forces required to initiate and to sustain the relative movement,
   (6) recording the forces measured,
   (7) computing the static and kinetic coefficients of friction from the data obtained.
2. In a friction testing apparatus for determining frictional characteristics between contacting surfaces of three test specimens, the combination comprising:
   means for supporting a first specimen having two exposed surfaces,
   means for holding second and third specimens against opposite sides of said first specimen,
   means for applying a predetermined normal force through said contacting surfaces which tends to urge each of said second and third specimens into contact with said first specimen,
   means for causing relative mocement of said second and third specimens with respect to said first specimen,
   means for maintaining the contacting surfaces of said second and third specimens in alignment with the contacting surfaces of said first specimen during said relative movement,
   means for measuring forces required to initiate and sustain said relative movement,
   means for recording forces measured.

3. Apparatus according to claim 2 wherein said means for applying a predetermined normal force comprises a linear actuator responsive to fluid pressure; and wherein said means for maintaining the contacting surfaces of said second and third specimens in alignment comprises self-aligning bearing means.

4. Apparatus according to claim 3 wherein said means for holding includes means for preventing feedback of frictionally induced transverse binding loads into said linear actuator, said means for preventing feedback comprising an element arranged for free movement in a direction parallel to said normal force but prevented from substantial motion in a direction transverse to said normal force.

5. Apparatus according to claim 4 wherein one of said second and third specimens comprises a low friction bearing element.

6. Apparatus according to claim 3 wherein said means for holding is attached to a fixed crosshead portion of a tensile testing machine, and said means for supporting is carried by a moveable crosshead portion of said tensile testing machine.

References Cited

UNITED STATES PATENTS

| | | | |
|---|---|---|---|
| 2,531,906 | 11/1950 | Christian | 73—9 |
| 3,033,019 | 5/1962 | Oliver | 73—9 |
| 3,170,322 | 2/1965 | Cavanaugh | 73—103 |
| 3,176,507 | 4/1965 | Digesu et al. | 73—103 |

OTHER REFERENCES

Publication: "Westinghouse Friction Tester," 4 pages, Technical Bulletin 99–361, dated August 1963.

Publication: "Tinius Talk," pp. 1, 2 and 3 only, Technical Bulletin by the Tinius Olsen Testing Co., dated November 1965, vol. 17, No. 1.

LOUIS R. PRINCE, Primary Examiner

D. M. YASICH, Assistant Examiner